United States Patent [19]

Hillis et al.

[11] Patent Number: 5,050,069

[45] Date of Patent: Sep. 17, 1991

[54] METHOD AND APPARATUS FOR SIMULATING M-DIMENSION CONNECTION NETWORKS IN AND N-DIMENSION NETWORK WHERE M IS LESS THAN N

[75] Inventors: W. Daniel Hillis, Brookline; Brewster Kahle, Sommerville; George G. Robertson, Marblehead; Guy L. Steele, Jr., Lexington, all of Mass.

[73] Assignee: Thinking Machines Corporation, Cambridge, Mass.

[21] Appl. No.: 42,761

[22] Filed: Apr. 27, 1987

[51] Int. Cl.$^5$ .............................................. G06F 13/20
[52] U.S. Cl. .................................... 364/200; 364/229; 364/229.4; 364/238.3; 364/259.1; 364/284; 364/284.4
[58] Field of Search ..................... 364/200, 900, 300

[56] References Cited

U.S. PATENT DOCUMENTS

| 4,065,808 | 12/1977 | Schomberg et al. | 364/200 |
|---|---|---|---|
| 4,523,273 | 6/1985 | Adams, III et al. | 364/200 |
| 4,598,400 | 7/1986 | Hillis | 370/60 |
| 4,639,857 | 1/1987 | McCanny et al. | 364/200 |
| 4,644,496 | 2/1987 | Andrews | 364/900 |
| 4,709,327 | 11/1987 | Hillis et al. | 364/200 |
| 4,727,474 | 2/1988 | Batcher | 364/200 |
| 4,739,476 | 4/1988 | Fiduccia | 364/200 |

FOREIGN PATENT DOCUMENTS 6015768  1/1985  Japan ................... 364/200

OTHER PUBLICATIONS

E. N. Gilbert, "Gray Codes and Paths on the N-Cube.", The Bell System Technical Journal (May 1958), pp. 815-826.

Martin Gardner, "The Binary Gray Code." In: Knotted Doughnuts and Other Mathematical Entertainments, W. H. Freeman and Company, New York, (pp. 11-27).

W. Lin et al., "Reconfiguration Procedures for a Polymorphic and Partitionable Multiprocessor.", IEEE Transactions on Computers, vol. C-35, No. 10, (Oct. 1986), pp. 910-915.

T. Bartee, "Read-Only Memories", in: T. Bartee Digital Computer Fundamentals (New York, McGraw-Hill Book Company, 1977), pp. 316-318.

H. Taub et al., "The Grey Reflected Binary Code", in: H. Taub et al., Digital Integrated Electronics (New York, McGraw-Hill, Inc., 1977), pp. 106-107.

F. P. Preparata et al., "The Cube-Connected Cycles: A Versatile Network Parallel Computation", Communications of the ACM, vol. 24, No. 5, (May 1981), pp. 300-309.

NCR Handbook (NCR45CG72), "Geometric Arithmetic Parallel Processor", 1st Ed., Dayton, Ohio, NCR Corporation, 1984, pp. 1-12.

(List continued on next page.)

Primary Examiner—Thomas C. Lee
Assistant Examiner—Robert B. Harrell
Attorney, Agent, or Firm—Pennie & Edmonds

[57] ABSTRACT

In accordance with the invention, each element or mode in the n-dimensional connection pattern is assigned a unique binary number or address by numbering the elements. Next, the individual binary digits of the address associated with each element are assigned to the different dimensions of the connection pattern of m dimension according to a fixed rule. Each set of binary digits that is so assigned to a dimension is then treated as the address of the node in that dimension in a gray code space; and the nodes that are its nearest neighbors in that dimension are those nodes that bear the Gray code values immediately before it and immediately after it in the Gray code sequence. Data are then routed to the nearest neighbor in one direction in a dimension by forwarding them from one node to the node bearing the next succeeding (or preceding) Gray code address and a node can be conditioned to receive such data by having it look for data from the node with the next preceding (or succeeding) address.

42 Claims, 5 Drawing Sheets

OTHER PUBLICATIONS

NCR Handbook (NCR45CG72 GAPP Application Note No. 3), "Detection of Edges and Gradients in Binary and Gray Scale Images with the Gapp Processor", 1st ed., Dayton, Ohio, NCR Corporation, 1985, pp. 1-23.

L. Adams, "Modeling Algorithm Execution Lime on Processor Arrays.", IEEE Computer (Jul. 1984), pp. 38-43.

R. Asbury et al., "Concurrent Computers for Inherently Parallel Problems", Computer Design (Sep. 1, 1985), pp. 99-102, 104, 106, 107.

K. Batcher, "Design of a Massively Parallel Processor", IEEE Transactions on Computers, vol. C-29, No. 9 (Sep. 1980), pp. 836-840.

T. Hoshino t al., "An Invitation to the World of PAX", IEEE, Computer (May 1986), pp. 68-79.

C. Seitz, "The Cosmic Cube", Communications of the ACM, vol. 28, No. 1, (Jan. 1985), pp. 22-33.

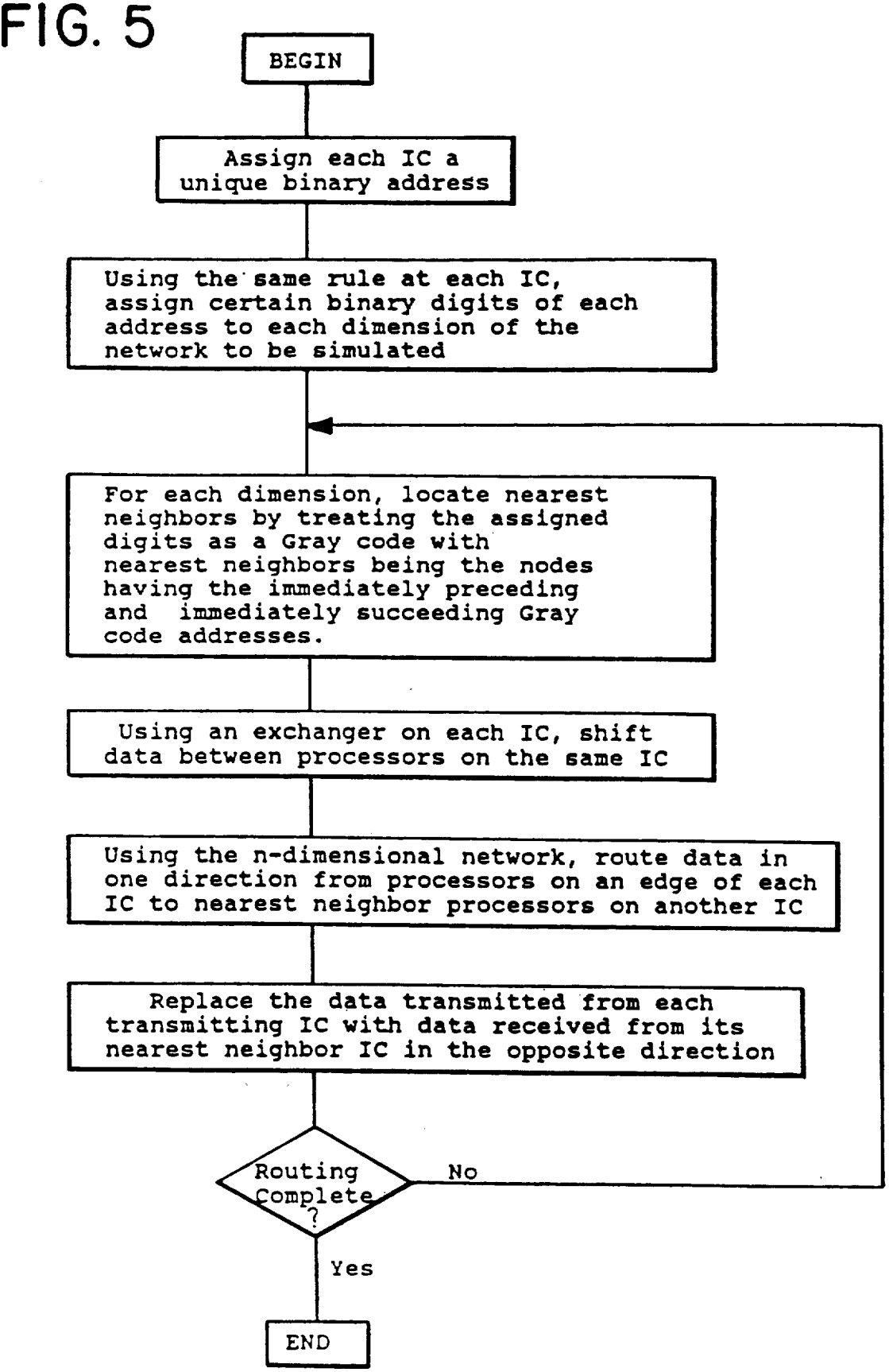

METHOD AND APPARATUS FOR SIMULATING M-DIMENSION CONNECTION NETWORKS IN AND N-DIMENSION NETWORK WHERE M IS LESS THAN N

CROSS REFERENCE TO RELATED APPLICATIONS

Related applications are "Parallel Processor," Ser. No. 499,474, now U.S. Pat. No. 4,814,973, and "Parallel Processor/Memory Circuit," Ser. No. 499,471, now U.S. Pat. No. 4,709,327, both filed May 31, 1983, "Method and Apparatus for Routing Message Packets," Ser. No. 671,835, filed Nov. 15, 1984, now U.S. Pat. No. 4,598,400, "Method and Apparatus for Interconnecting Processors in a Hyper-Dimensional Array," Ser. No. 740,943, now U.S. Pat. No. 4,805,091, filed May 31, 1985, "Very Large Scale Computer", Ser. No. 902,290, now abandoned, filed Aug. 29, 1986, and "Massively Parallel Processor", Ser. No. 924,090, now abandoned, filed Oct. 28, 1986, all of which are incorporated herein by reference.

BACKGROUND OF THE INVENTION

This relates to multi-dimension connection networks. It is particularly useful in the interconnection of parallel processors such as those described in the aboverefrenced U.S. Pat. No. 4,598,400 and will be described in that context, but it has applications in other areas as well.

As shown in FIG. 1A of U.S. Pat. No. 4,598,400, the parallel processor system of that patent comprises a mainframe computer 10, a microcontroller 20, an array 30 of parallel processing integrated circuits 35, a data source 40, a first buffer and multiplexer/demultiplexer 50, first, second, third and fourth bidirectional bus control circuits 60, 65, 70, 75, a second buffer and multiplexer/demultiplexer 80, and a data sink 90. Mainframe computer 10 may be a suitably programmed commercially available general purpose computer such as a VAX computer manufactured by Digital Equipment Corp. Microcontroller 20 is an instruction sequencer of conventional design for generating a sequence of instructions that are applied to array 30 by means of a thirty-two bit parallel bus 22. Microcontroller 20 receives from array 30 a signal on line 26. Bus 22 and line 26 are connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

Array 30 contains thousands of identical ICs 35; and each IC 35 contains several identical processor/memories 36. In the embodiment disclosed in the '400 patent, it is indicated that the array may contain up to 32,768 ($=2^{15}$) identical ICs 35; and each IC 35 may contain 32 ($=2^5$) identical processor/memories 36. At the time of filing of this application for patent, arrays containing up to 4096 ($=2^{12}$) identical ICs 35 containing 16 ($=2^4$) identical processor/memories each have been manufactured and shipped by the assignee as Connection Machine (Reg. TM) computers.

The '400 patent discloses a parallel processor in which processor/memories 36 are organized and interconnected in two geometries. The first is a conventional two-dimensional grid pattern in which the processor/memories are organized in a square array and connected to their four nearest neighbors in the array. The second is a Boolean n-cube of fifteen dimensions. To connect processor/memories 36 in a two-dimensional grid pattern, ICs 35 of array 30 are organized in a rectangular array of 256 ($=2^8$) rows and 128 ($=2^7$) columns; and the 32 processor/memories of each IC are connected in a rectangular array of 4 ($=2^2$) rows and 8 ($=2^3$) columns. As a result, the 1,048,576 processor/memories 36 of array 30 are connected in a square of 1024 ($=2^{10}$) rows and 1024 columns. For convenience, the sides of this square array are identified as NORTH, EAST, SOUTH and WEST. To connect each processor/memory to its four nearest neighbors, the individual processor/memories are connected by electrical conductors between adjacent processor/memories in each row and each column; and the four nearest neighbors of any IC except those on the edges of the array will be recognized to be the four ICs immediately adjacent that IC on the North, East, South and West, respectively.

The above-described two dimensional grid does not provide for rapid interchange of data in random directions between processor/memories 36 in the two-dimensional array. Moreover, to move data between an edge of the array and a specific processor/memory, it is necessary to shift it through all the processor/memories between the edge and the processor/memory of interest, which may require shifts through more than 500 processor/memories. Even where it is possible to make a single such shift at very high speeds, the need to do more than 500 such shifts makes the complete operation maddeningly slow. With the added complications of making such shifts at the same time for large numbers of processor/memories in random and independent directions, it becomes impossible to operate such a large two-dimensional grid of processor/memories at reasonable cost.

This problem is alleviated by also organizing and interconnecting processor/memories 36 in accordance with a second geometry. In particular, in the example set forth in the '400 patent, ICs 35 are organized and interconnected in the form of a Boolean n-cube of fifteen dimensions. Each IC is provided with logic circuitry to control the routing of messages through such an interconnection network; and within each IC, bus connections are provided to the thirty-two processor/memories so that every one of the more than one million processor/memories can send a message to every other. Moreover, large numbers of messages may be sent at any time and the messages may be routed in random directions.

The advantages of such hyper-dimensional interconnection network are so substantial compared with those of the conventional two-dimensional interconnection network that the question arises whether two interconnection networks can be justified. The two-dimensional network has the advantage that it is identical in structure to many data arrays that might be manipulated by parallel processors. Thus, with a two-dimensional interconnection network it is possible to perform quite readily operations on left or right, upper or lower neighbors such as are often performed in manipulating two-dimensional data arrays. However, the cost of the two-dimensional network is a large amount of the limited area on an integrated circuit and a very high number of the interconnections or pins on the integrated circuit relative to the function provided. For example, if each integrated circuit carries a 4×4 array of processors, then 16 pins are needed to provide for connections to left and right, upper and lower neighboring processors on adjacent integrated circuits. While these numbers can be reduced by multiplexing the pin directions, a minimum of three pins are still needed for this size array.

SUMMARY OF THE INVENTION

We have devised a method and apparatus for eliminating such two-dimensional connection network by simulating the network in a higher dimensional connection network. Moreover, we have devised a method and apparatus by which a connection network of any number m of dimensions can be simulated in a connection network of any larger number n of dimensions.

In accordance with the invention, each element or node in the n-dimensional connection pattern is assigned a unique binary number or address by numbering the elements. Next, the individual binary digits of the address associated with each element are assigned to the different dimensions of the connection pattern of m dimensions according to a fixed rule. Each set of binary digits that is so assigned to a dimension is then treated as the address of the node in that dimension in a Gray code space; and the nodes that are its nearest neighbors in that dimension are those nodes that bear the Gray code values immediately before it and immediately after it in the Gray code sequence. Data are then routed to the nearest neighbor in one direction in a dimension by forwarding them from one node to the node bearing the next succeeding (or preceding) Gray code address and a node can be conditioned to receive such data by having it look for data from the node with the next preceding (or succeeding) address.

Advantageously the present invention may be implemented to simulate a two-dimensional interconnection network in an array of ICs that are interconnected in the form of a hypercube of twelve or more dimensions.

Moreover, by use of an exchanger or permuter, it is also possible to simulate interconnection patterns of different dimensions on individual IC chips. In a preferred embodiment, the exchanger is used to store data from each of an array of processors on an IC chip in portions of memory associated with different processors. With appropriate exchanges, the data storage patterns can simulate the same shift in data that would occur under specified operations in a network of one, two or more dimensions. In addition, such intrachip shifts can be combined with interchip data transfers so as to extend the connection patterns simulated on individual chips over the entire array of chips in the n-dimensional connection network.

BRIEF DESCRIPTION OF DRAWING

These and other objects, features and advantages of the invention will be more readily apparent from the following detailed description of the invention in which

FIG. 5 is a flowchart of a further application of the invention.

DESCRIPTION OF THE PREFERRED EMBODIMENTS

Figure 1:
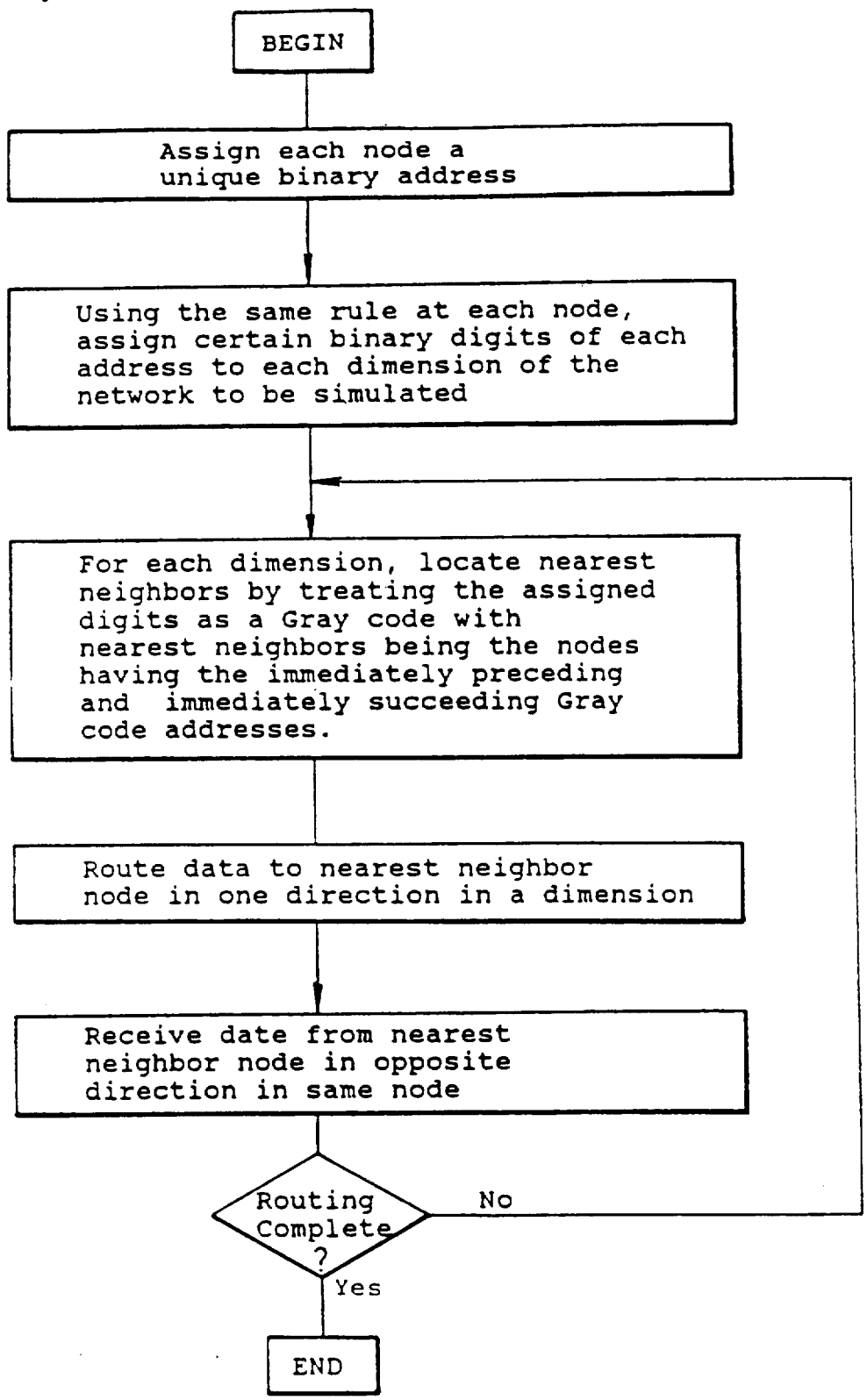
FIG. 1 is a flowchart depicting a preferred embodiment of the invention.

To understand an n-dimension cube connection pattern, it is helpful to number the elements of the pattern consecutively and to express these numbers or addresses in binary notation. If, for example, the connection pattern is implemented in an array of 4096 integrated circuits, one can number the ICs from 0 to 4095 and write these numbers in binary digits as in Table I.

TABLE I

| IC address in decimal notation | IC address in binary notation |
|---|---|
| 0 | 000 000 000 000 |
| 1 | 000 000 000 001 |
| 2 | 000 000 000 010 |
| 3 | 000 000 000 011 |
| 4 | 000 000 000 100 |
| . | . |
| . | . |
| 4093 | 111 111 111 101 |
| 4094 | 111 111 111 110 |
| 4095 | 111 111 111 111 |

Since an IC in the n-cube can have one of only two different positions, 0 and 1, in each dimension, the twelve-digit IC address in binary notation as set forth in Table I also can be used to specify the IC's position in the twelve dimensions of the n-cube. For convenience, we will use the left-hand-most digit of the twelve binary digits to specify the IC's position in the first dimension, and so on in order to the right-hand-most digit which specifies the IC's position in the twelfth dimension.

Moreover, because a binary digit can have only two values, zero or one, and because each IC is identified uniquely by twelve binary digits, each IC has twelve other ICs whose binary address differs by only one digit from its own address. We will refer to these twelve ICs whose address differs by only one from that of a first IC as the first IC's nearest neighbors. Those familiar with the mathematical definition of a Hamming distance will recognize that the first IC is separated from each of its twelve nearest neighbors by the Hamming distance one. Two examples of the addresses of an IC and its twelve nearest neighbors are set forth in Table II.

TABLE II

| Example I | Example II |
|---|---|
| IC address: | |
| 000 000 000 000 | 101 010 101 010 |
| Addresses of nearest neighbors: | |
| 000 000 000 001 | 101 010 101 011 |
| 000 000 000 010 | 101 010 101 000 |
| 000 000 000 100 | 101 010 101 110 |
| 000 000 001 000 | 101 010 100 010 |
| 000 000 010 000 | 101 010 111 010 |
| 000 000 100 000 | 101 010 001 010 |
| 000 001 000 000 | 101 011 101 010 |
| 000 010 000 000 | 101 000 101 010 |
| 000 100 000 000 | 101 110 101 010 |
| 001 000 000 000 | 100 010 101 010 |
| 010 000 000 000 | 111 010 101 010 |
| 100 000 000 000 | 001 010 101 010 |

Physically, the ICs are mounted in one- or two-dimensional arrays on integrated circuit boards. They are connected in the form of a twelve-dimension cube patter by physically running wires from each IC to its twelve nearest neighbors in the cube. An especially advantageous wiring technique for accomplishing this interconnection is described in the above-reference 740,943 application.

Since there is one wire associated with each dimension and only two ICs in each dimension, it can be shown that the exclusive OR of the addresses of any two ICs is a twelve digit number in which the 1 bits specify the dimensions that must be used to interconnect the two ICs and therefore the wires of the n-dimension cube that interconnect the two ICs. Further appreciation of hyper-dimensional interconnection patterns can be obtained from a consideration of the three- and four-dimension cube connection networks shown in FIGS. 2 and 3 of the above-referenced '400 patent.

To simulate a connection pattern of lower dimensions in an n-dimensional pattern, it is necessary to establish in the n-dimensional pattern a connection pattern that functions in the same way as the connection pattern of lower dimensions. To provide a practical simulation, it must also be possible to implement this simulation in a series of parallel operations that can be performed simultaneously at all elements of the n-dimensional pattern.

In accordance with the invention, this is done as shown in FIG. 1 in the following steps. First, each element or node in the n-dimensional connection pattern is assigned a unique binary number or address by numbering the elements. Next, the individual binary digits of the address associated with each element are assigned to the different dimensions of the connection pattern of lower dimensions according to a fixed rule. For example, for a two-dimension connection pattern, the first six bits of a twelve bit binary address might be assigned to the first dimension or x-coordinate of the two-dimension connection pattern and the last six bits to the second dimension or y-coordinate. Alternatively, the odd-numbered bits could be assigned to the first dimension and the even-numbered bits to the second. Any rule can be used as long as it is consistently followed for every binary address in the n-dimensional pattern.

Each set of binary digits that is so assigned to a dimension is then treated as the address of the node in that dimension in a Gray code space; and the nodes that are its nearest neighbors in that dimension are those nodes that bear the Gray code values immediately before it and immediately after it in the Gray code sequence. Thus, for a given node the address of its nearest neighbor node in one direction in a dimension can be determined by converting the Gray code address of the given node in that dimension to its binary equivalent, adding a binary value of one to such equivalent and converting the result back to Gray code. The address of the nearest neighbor in the other direction in the same direction is obtained by the same process except that a binary one is subtracted from the binary equivalent rather than added. Alternatively, the Gray code addresses of the nearest neighbor ICs could be determined from a sequential listing of the Gray codes.

In similar fashion, the sets of binary digits assigned to each other dimension of the connection network of lower dimensions are likewise treated as Gray code addresses of that node; and in each dimension the nearest neighbors are determined by adding and subtracting a binary one from the binary equivalent of the Gray code value and converting the results to Gray code values.

Data can then be routed to the nearest neighbor in one direction in a desired dimension by forwarding them via the n-dimensional network from one IC to the IC bearing the next succeeding Gray code address; and an IC can be conditioned to receive such data by having it look for data from the IC with the next preceding address. Alternatively, data can be routed in the opposite direction by forwarding it from one IC to the IC bearing the next preceding address and by looking for data from the IC with the next succeeding address.

The appropriate cube wire to use is determined by taking the exclusive OR of the Gray code addresses of the source IC and the destination IC. Since these addresses are sequential Gray code addresses they differ by only one bit and that one bit specifies the wire to be used for communication. Similarly, the wire to be monitored for receipt of data is also determined by taking the exclusive OR of the Gray code addresses of the source IC and the destination IC. Again these addresses are sequential Gray code addresses and the one bit of difference specifies the wire used for communication.

These nearest neighbor interconnections can then be used as much as needed for routing data onward in the same dimension. And in like fashion nearest neighbor addresses can be determined in different dimensions.

Moreover, exactly the same calculations and operations are performed at each node to determine its nearest neighbors. Thus, the same bits of the node address are examined at each node to determine the Gray code address in that dimension. The same steps are performed to determine the address and cube wire for the nearest neighbor IC in the desired direction in that dimension; and the same steps are performed to determine the address and cube wire of the nearest neighbor IC in the opposite direction. As a result, all the ICs of the n-dimensional network can be operated on simultaneously to move data to their nearest neighbors in a dimension in accordance with the ordering determined by the Gray code sequence.

The following example illustrates the practice of the invention. In accordance with the invention a unique binary number is assigned to each node in the interconnection network. Assume that there are 4096 ($=2^{12}$) nodes in the network and that the binary number 000 111 001 101 is assigned to one of these nodes. To determine the nearest neighbors of this node in a two-dimensional network, some of the digits of the binary number are assigned to one dimension and some to the other. Assume that the first six digits are assigned to the first dimension or x-coordinate and the last six to the second dimension or y-coordinate. Since each node has a unique binary number, the six digits in each dimension specify a two-dimensional array of $64 \times 64$ ($=2^6 \times 2^6$) nodes. These digits are then treated as Gray codes for purposes of determining their nearest neighbors in the first and second (or x and y) dimensions and thereby specifying their interconnections.

There are different Gray codes and different formulas for their generation. A preferred formula for generating a Gray code of a binary number n is $$\text{Gray code }(n) = n \oplus (n \text{ rightshift } 1) \tag{1}$$

where $\oplus$ is the logical operation of exclusive OR and (n rightshift 1) is the binary number n shifted 1 to the right. Conversely, the binary equivalent number of a Gray code can be determined by using the following formula on a digit-by-digit basis to generate the digits of the binary number:

$$bd_i = gd_i \oplus gd_{i-1} \oplus \cdots \oplus gd_1 \qquad (2)$$

where $\oplus$ is the logical operation of exclusive OR, i is the number of digits in the binary number or its Gray code equivalent, $bd_i$ is the ith such binary digit, and $gd_i$ is the ith such Gray code digit. Advantageously, these formulas are used in the practice of the invention to calculate Gray code and binary conversions. However, for purposes of understanding the example, a table relating the Gray codes to their binary values is more useful and the first sixteen values and last value of such a sixty-four value code table are set forth in Table III.

TABLE III

| Binary Value | Gray Code Value |
| --- | --- |
| 000000 | 000000 |
| 000001 | 000001 |
| 000010 | 000011 |
| 000011 | 000010 |
| 000100 | 000110 |
| 000101 | 000111 |
| 000110 | 000101 |
| 000111 | 000100 |
| 001000 | 001100 |
| 001001 | 001101 |
| 001010 | 001111 |
| 001011 | 001110 |
| 001100 | 001010 |
| 001101 | 001011 |
| 001110 | 001001 |
| 001111 | 001000 |
| ⋮ | ⋮ |
| 111111 | 100000 |

Thus, to find the nearest neighbors in the first dimension of the node having address 000 111 001 101, the number 000 111 is regarded as a Gray code value, and its binary equivalent is calculated to be 000 101 using formula (2). To find the nearest neighbor in one direction, the binary value 1 is added to this equivalent to yield the value 000 110 which is then converted to the Gray code value of 000 101 using formula (1), thereby identifying the node in that direction. The exclusive OR of the addresses 000 111 and 000 101 produces the number 000 010 indicating that the routing wire is the fifth cube wire of the set which corresponds to the fifth dimension in the 12-dimension network. To locate the nearest neighbor in the other direction, the binary value 1 is subtracted from the binary equivalent to yield the value 000 100 which is then converted to 000 110, thereby identifying the node in that direction. The exclusive OR of 000 111 and 000 110 produces the number 000 001, indicated that communication with the nearest neighbor in the other direction is via the sixth wire of the set which corresponds to the sixth dimension of the 12-dimension network.

In like fashion, the nearest neighbors in the second dimension are determined to be located at 001 100 and 001 111 and communication with these nodes in the two-dimension network is over the fifth and sixth wires of the set corresponding to the eleventh and twelfth dimensions of the 12-dimension network.

If it is desired to simulate networks having other than two dimensions, this is simply a matter of assigning appropriate binary digits of the address of each node of the n-dimension connection network to the desired number of dimensions. After the assignment is made, operations are performed independently on each dimension in the fashion described above for the example of a simulated two-dimension network.

In the apparatus described in the '400 patent, the two-dimensional interconnection network is also used to interconnect individual processors on an integrated circuit; and the two-dimensional pattern that is established on each IC carries over from one chip to its nearest neighbors in a two-dimensional array of chips Thus, for the case where the processors are interconnected in a two-dimensional pattern of four rows and eight columns, the four processors on the right hand side of one IC have each a nearest neighbor processor to their right that is located on the left hand side of an IC that is the nearest neighbor IC to the right; the eight processors along an upper edge of one IC have each a nearest neighbor processor above them that is located on the lower edge of an IC that is the nearest neighbor IC in the upper direction; and so forth to the left and to the lower directions. If desired, this two-dimensional interconnection network on the individual IC chips can also be simulated by use of the techniques described above and apparatus which is already used in commercial embodiments of the device shown in the '400 patent.

Figure 2:
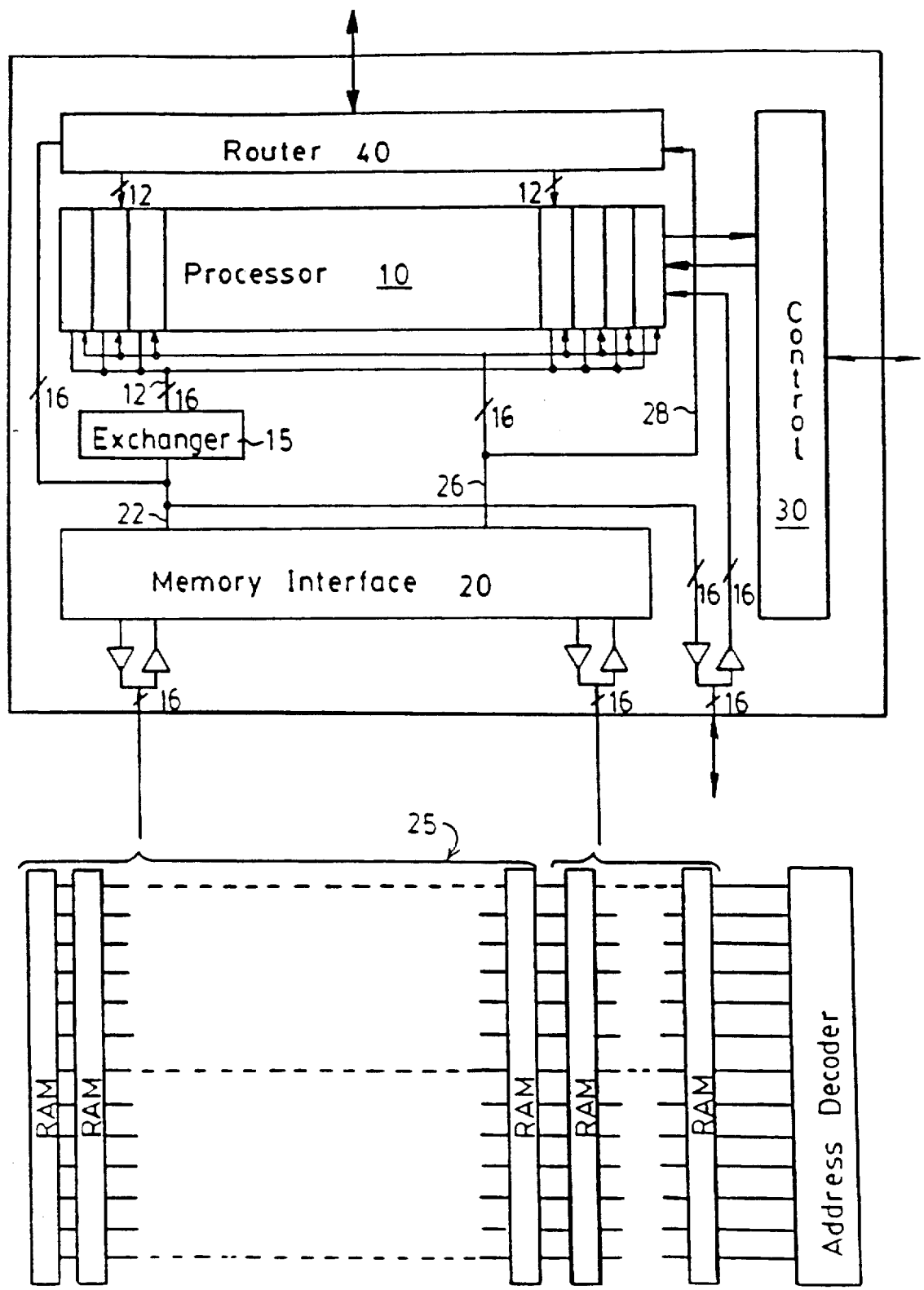
FIG. 2 is a schematic illustration of integrated circuits that may be used in the practice of the invention.

In particular, as shown in schematic form in FIG. 2, an illustrative integrated circuit for use in a parallel processor comprises sixteen processors 10, a memory interface 20, a control circuit 30, and a communications interface or router 40. Illustratively, the processors are similar to those described in the '400 patent but have a read/write memory 25 located on one or more other ICs that is accessed through the memory interface in a manner shown, for example, in FIG. 6 of the above-referenced 924,090 application. Data that is to be stored for future use by the same processor or transmitted to other processors on the same IC or to processors on other ICs are supplied from processors 10 via databuses 12 and 22 and memory interface 20 to read/write memory 25 where they are stored until they can be used or transmitted. For data that are to be used by originating processor or by other processors on the same IC, the data are removed from the read/write memory and supplied to the processors via memory interface 20 and data bus 26. For transmission to other ICs, the data are removed from read/write memory 25 and supplied to communication interface 40 via memory interface 20 and data bus 28. The communications interface is connected to cube wires 42 leading to other integrated circuits so as to establish an n-dimensional interconnection network among the integrated circuits.

Figure 3:
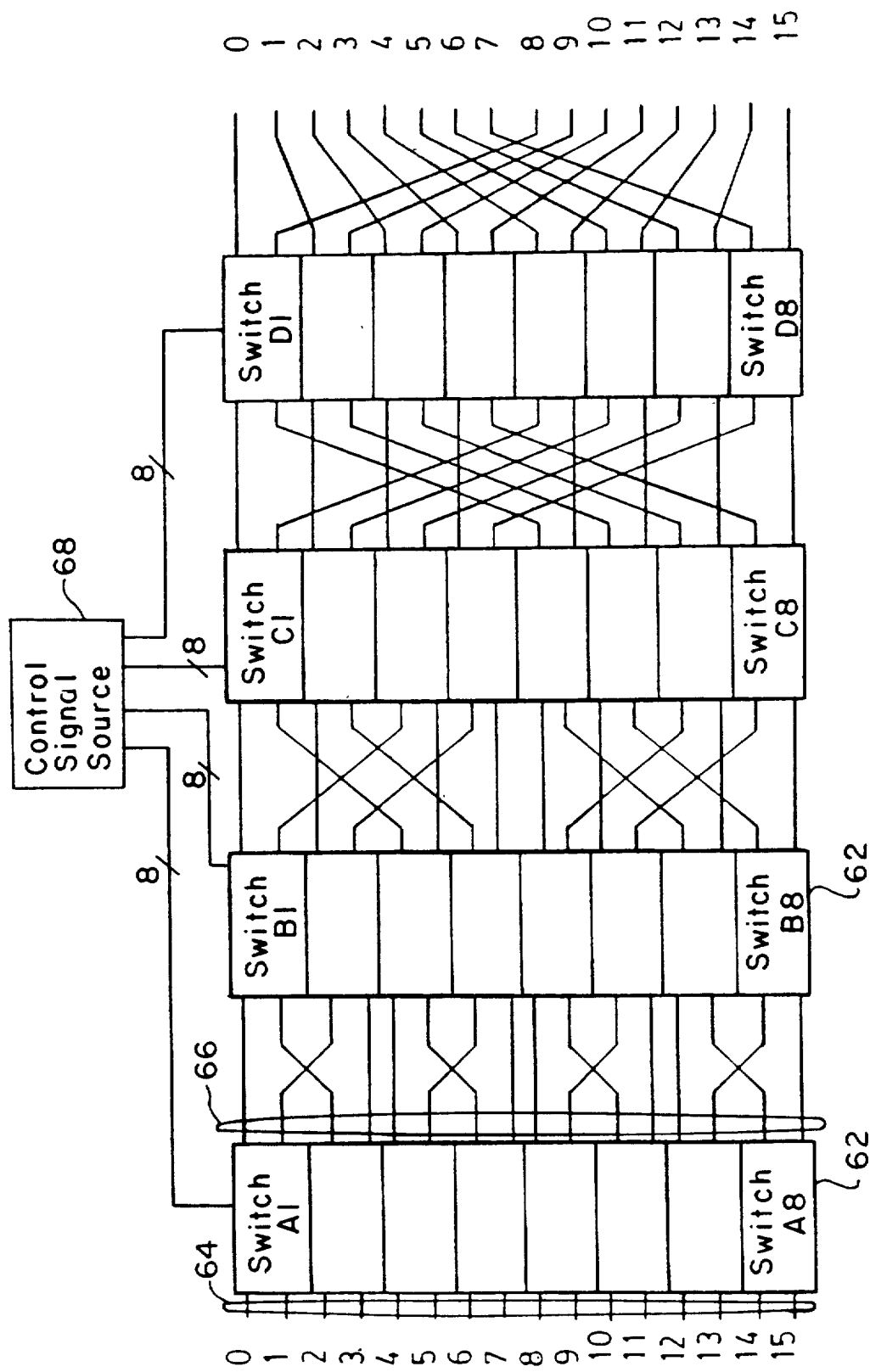
FIG. 3 is a schematic illustration of an exchanger used in the practice of a further aspect of the invention.
Figure 4:
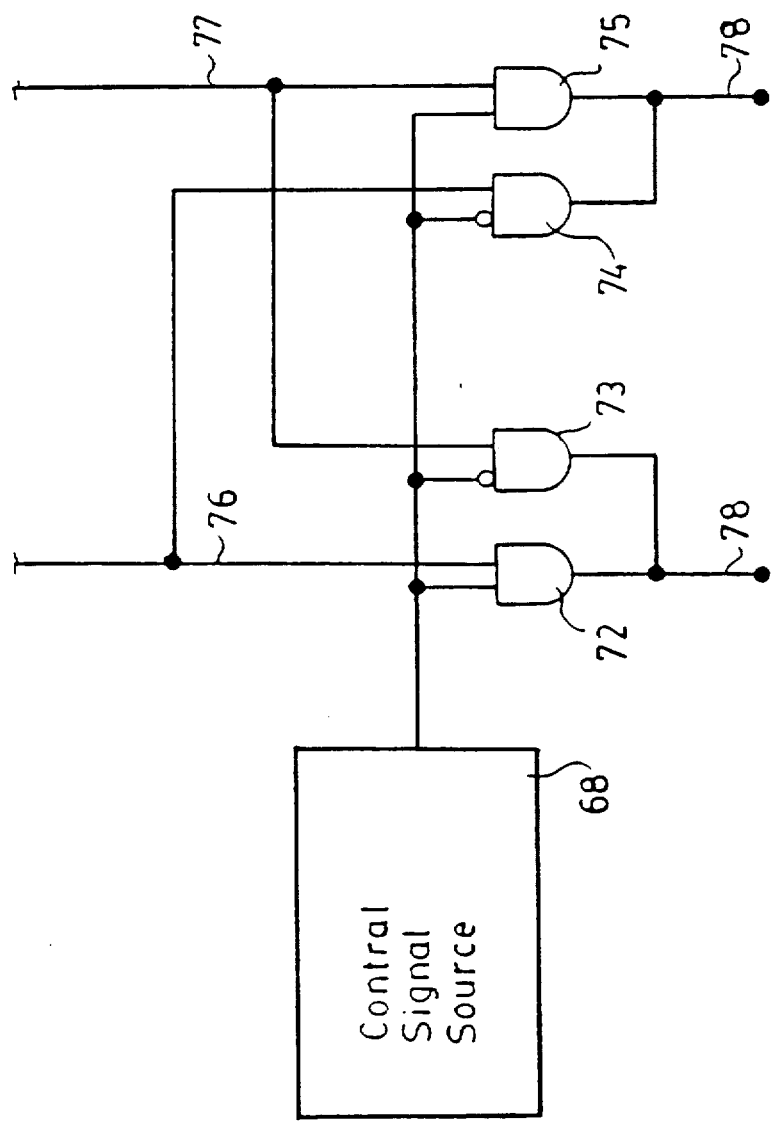
FIG. 4 is a schematic diagram of an illustrative embodiment of a switch used in the exchanger.

Associated with processors 10 is an exchanger or permuter 15 for interchanging the signals on the output lines from the processors before such signals are applied to the memory interface. As shown in FIG. 3, the exchanger comprises an array of switches 62 each connected as shown between an array of inputs 64 and an array of outputs 66 and a control signal source 68 for each switch. As shown in FIG. 4, each switch 62 illustratively comprises four AND gates 72-75 connected as shown between a pair of inputs 76, 77 and a pair of outputs 78, 79 and controlled by a signal from source 68. In operation, a signal input on line 76 is output on line 78 or line 79 depending on the state of the signal from source 68; and, in similar fashion, a signal input on line 77 is output on line 79 or line 78 depending on the signal from source 68. As a result, the signals on lines 76 and 77 are either exchanged or not.

Illustratively, as shown in FIG. 3, the exchanger is designed to interchange signals on sixteen input lines 64, one from each of the processors, for which a 4×8 array of switches A1-A8 through D1-D8 and thirty-two signal sources 68 are required. The signal sources illustratively are implemented in a register or registers having a thirty-two bit output, each bit controlling the state of a different switch.

In accordance with the invention, exchanger 15 and memory 25 can be used to shift data between processors in patterns that simulate connection arrays such as those of one or two dimensions. In particular, different portions of memory 25 are written by different output lines 24 from exchanger 15 and the data stored in such portions is made available each to a different processor. Accordingly, by interchanging the signals on the output lines from the processors, data from one processor can be stored in the portion of memory associated with another processor and can then be read out of that portion and supplied to the other processor. For example, let us identify the sixteen processors by the letters --p and assume the processors are arranged in a 4×4 array as shown in Table IV.

TABLE IV

| a | b | c | d |
| e | f | g | h |
| i | j | k | l |
| m | n | o | p |

Each of these processors has a data output which is connected to one of the input lines of exchanger 15. For as shown in columns 1 and 2 of Table V, processor a is connected to input line 0, processor b to line 1 and so forth. For appropriate settings A-F of switches 62, data input to exchanger 15 on line 0 from processor a will be output from the exchanger on lines 3, 1, 4, 12, 1 and 15, respectively, and therefore will be stored in memory in the space associated with processor d, b, e, m, b and p respectively. Likewise, for each other input/output line, Table V indicates the relationship between the information on the input and output lines and the switch settings.

TABLE V

| I/O line | data source | switch setting | | | | | |
|---|---|---|---|---|---|---|---|
| | | A | B | C | D | E | F |
| | | data output | | | | | |
| 0 | a | d | b | e | m | b | p |
| 1 | b | a | c | f | n | c | a |
| 2 | c | b | d | g | o | d | b |
| 3 | d | c | a | h | p | e | c |
| 4 | e | h | f | i | a | f | d |
| 5 | f | e | g | j | b | g | e |
| 6 | g | f | h | k | c | h | f |
| 7 | h | g | e | l | d | i | g |
| 8 | i | l | j | m | e | j | h |
| 9 | j | i | k | n | f | k | i |
| 10 | k | j | l | o | g | l | j |
| 11 | l | k | i | p | h | m | k |
| 12 | m | p | n | a | i | n | l |
| 13 | n | m | o | b | j | o | m |
| 14 | o | n | p | c | k | p | n |
| 15 | p | o | m | d | l | a | o | where switches A1-A8, B2, B4, B6, B8, are set to exchange signals in switch setting A;

switches A1-A8, B6, B3, B5, B7, are set to exchange signals in switch setting B;

switches C1-C8, D1-D4 are set to exchange signals in switch setting C;

switches C1-C8, D5-D8 are set to exchange signals in switch setting D;

switches A1-A8, B1, B3, B5, B7, C1, C5, D1 are set to exchange signals in switch setting E; and switches A1-A8, B2, B4, B6, B8, C4, C8, D8 are set to exchange signals in switch setting F.

For switch settings A-D, the exchanger output is such that data from processors a-p is now stored in memory in the patterns shown in Tables VIA-VID, respectively.

TABLE VIA

| d | a | b | c |
| h | e | f | g |
| l | i | j | k |
| p | m | n | o |

TABLE VIB

| b | c | d | a |
| f | g | h | e |
| j | k | l | i |
| n | o | p | m |

TABLE VIC

| e | f | g | h |
| i | j | k | l |
| m | n | o | p |
| a | b | c | d |

TABLE VID

| m | n | o | p |
| a | b | c | d |
| e | f | g | h |
| i | j | k | l |

Thus, switch setting A has in effect shifted the data from the processors of the 4×4 array one column to the right, switch setting B has shifted the data one column to the left, switch setting C has moved them up one row and setting D down one row. Settings E and F likewise have produced one unit left and one unit right shifts of a one-dimensional sequential array of sixteen elements.

The foregoing provides a means of simulating one- and two-dimensional connection networks in a circuit using an exchanger and memory instead of direct physical wiring between nearest neighbor elements. This technique can be extended to higher dimensions if desired.

This technique can also be combined with the simulation technique set forth in conjunction with FIG. 1 so as to extend, for example, a two-dimension array implemented in an exchanger across a multiplicity of IC chips that are connected in an n-dimensional cubical network. As shown in FIG. 5, this is accomplished by first identifying nearest neighbor chips following the same procedure set forth in FIG. 1, then using the exchanger to shift data from the processors on each chip to memory locations associated with different processors of the same chips, next using the n-dimensional network to transmit to the nearest neighbor ICs in the appropriate direction and dimension data from processors which were on the edge of each chip nearest the nearest neighbor IC, and finally replacing the transmitted data in memory at each transmitting IC with data received from its nearest neighbor IC in the opposite direction but the same dimension.

For example, to shift all data to the right one unit in the case of an n-dimensional cubical network of integrated circuit chips having a 4×4 array of processors on each chip, the chips are first numbered, their addresses are determined in the two-dimensional network and their nearest neighbors are identified using the Gray code sequence. On the chip level, the shift to the right is implemented by using switch setting A in exchanger 15 so as to store data from each processor on each chip in the memory space assigned to the processor to its right in the 4×4 array. Data from the four processors on the right hand side of each array are then transmitted by the n-dimensional network from each IC to its nearest neighbor IC to the right in the x- or row-dimension. The identity of the cube wire that provides this connection is determined by taking the exclusive OR of the address of the IC and the address of its nearest neighbor IC to the right in the row-dimension. At each IC, data is received from the immediately preceding IC on the left and the cube wire that provides this connection is identified by taking the exclusive OR of the address of the IC and the address of the immediately preceding IC to the left in the row-dimension. The data as received is written into the portion of memory associated with the processors on the left hand side of the 4×4 array. Thereafter the data stored in memory may be accessed by the individual processors, each of which now has the data that formerly were in the processor immediately to its left in the simulated two-dimensional network. The sequence of steps for shifting data to the left, up or down is similar.

From the foregoing description, numerous modifications will be apparent within the spirit and scope of the present invention.

What is claimed is:

1. A method of simulating an interconnection network of m dimensions in an array of nodes in a binary cube interconnection network of n dimensions where m is less than n comprising computer performed steps of:
    assigning to each node a unique binary number of at least n digits wherein each of n digits specifies the node's position in one dimension of the network of n dimensions,
    for each node, allocating to each of at least two of m dimensions certain of the digits in the binary number assigned to the node according to a rule which is applied to each binary number in like fashion, and
    for each node and with respect to each of the m dimensions for which said allocating step is performed, identifying that node's nearest neighbors in a dimension in the network of m dimension as those nodes at which the allocated digits of the binary numbers assigned to said nodes immediately precede and immediately succeed the allocated digits assigned to that node when the allocated digits are regarded as Gray code values.

2. The method of claim 1 further comprising a step of identifying at each node a dimension of the interconnection network which connects it to a nearest neighbor node by performing a logical exclusive OR operation on the allocated binary digits assigned to such node and the allocated binary digits assigned to the nearest neighbor node.

3. The method of claim 2 further comprising the step of communicating with a nearest neighbor node using said dimension.

4. The method of claim 1 further comprising the step of communicating with a nearest neighbor node in the simulated network of m dimensions.

5. The method of claim 1 wherein m is 2.

6. The method of claim 1 wherein the nodes are integrated circuits.

7. The method of claim 1 wherein the step of identifying nearest neighbor nodes comprises the steps of:
    converting the digits allocated to a node for one of m dimensions from a Gray code value to a binary equivalent value,
    adding to or subtracting from said binary equivalent value a binary value of one to produce a binary resultant value, and
    converting the binary resultant value to its Gray code equivalent.

8. In a parallel processor comprising an array of integrated circuits, each containing a plurality of processors, a device for permuting output signals from each processor and means for interconnecting said integrated circuits in an n-dimensional binary cube network when n is greater than two, a method of simulating a two-dimensional interconnection network that extends across said integrated circuits and the processors on said circuits comprising computer performed steps of:
    assigning to each integrated circuit a unique binary number of at least n digits wherein each of n digits specifies the integrated circuit's position in one dimension of the n-dimensional network;
    for each integrated circuit, allocating to each of two dimensions in the two-dimensional network certain of the digits in the binary number assigned to the integrated circuit according to a rule which is applied to each binary number in like fashion,
    for each integrated circuit, identifying that integrated circuit's nearest neighbors in each of the two dimensions of said two-dimensional network as those integrated circuits at which the allocated digits of the binary numbers assigned to said integrated circuits immediately precede and immediately succeed the allocated digits assigned to that integrated circuit when the allocated digits are regarded as Gray code values, and
    at each integrated circuit, using said permuting device to establish for each processor nearest neighbors in each of the two dimensions of the two dimensional network.

9. The method of claim 8 further comprising a step of using said n dimensional network to establish nearest neighbor processors in the two dimensional network for those processors on each integrated circuit that are at edges of the two dimensional network as defined on the integrated circuit.

10. The method of claim 9 wherein the step of using said n dimensional network to establish nearest neighbor processors further comprises the steps of routing data in a first direction from processors on an edge of each integrated circuit to nearest neighbor processors on another integrated circuit and replacing data transmitted from processors on each integrated circuit with data received at said integrated circuit from nearest neighbor processors on another integrated circuit.

11. The method of claim 10 wherein the received data is received from nearest neighbor processors located in a direction opposite to said first direction.

12. The method of claim 8 further comprising a step of communicating with a nearest neighbor integrated circuit in the simulated two-dimensional interconnection network.

13. The method of claim 9 wherein the processors on each integrated circuit are assigned positions in a two dimensional array and the permuting device is used to establish nearest neighbor processors by shifting data from each processor to the processors to its left, right, up or down in the assigned positions in the two dimensional array.

14. The method of claim 13 wherein the step of using said n-dimensional network to establish nearest neighbor processors further comprises the steps of routing data from processors on an edge of each integrated circuit to nearest neighbor processors on another integrated circuit and receiving routed data at processors on each integrated circuit that are assigned positions on an edge of the integrated circuit that is opposite the edge from which data was transmitted.

15. The method of claim 13 further comprising a step of identifying at each integrated circuit a dimension of the interconnection network which connects said integrated circuit to a nearest neighbor integrated circuit by performing a logical exclusive OR operation on the allocated binary digits assigned to such integrated circuit and the allocated binary digits assigned to the nearest neighbor integrated circuit.

16. The method of claim 15 further comprising the step of communicating with a nearest neighbor integrated circuit using said dimension.

17. The method of claim 8 wherein the step of identifying nearest neighbor integrated circuits comprises the steps of:
converting the digits allocated to an integrated circuit for one of m dimensions from a Gray code value to a binary equivalent value,
adding to or subtracting from said binary equivalent value a binary value of one to produce a binary resultant value, and
converting the binary resultant value to its Gray code equivalent.

18. In a parallel processor comprising an array of substantially identical integrated circuits, each containing at least one processor, and means for interconnecting said integrated circuits in an n-dimensional binary cube network when n is greater than two, a method of simulating a two-dimensional interconnection network that extends across said integrated circuits comprising computer performed steps of:
assigning to each integrated circuit a unique binary number of at least n digits wherein each of n digits specifies the integrated circuit's position in one dimension of the n-dimensional network,
for each integrated circuit, allocating to each of two dimensions in the two-dimensional network certain of the digits in the binary number assigned to the integrated circuit according to a rule which is applied to each binary number in like fashion, and
for each integrated circuit, identifying that integrated circuit's nearest neighbors in each of the two dimensions of said two-dimensional network as those integrated circuits at which the allocated digits of the binary numbers assigned to said integrated circuits immediately precede and immediately succeed the allocated digits assigned to that integrated circuit when the allocated digits are regarded as Gray code values.

19. The method of claim 18 further comprising the step of communicating with a nearest neighbor node in the simulated two-dimensional network.

20. The method of claim 18 further comprising a step of identifying at each integrated circuit a dimension of the interconnection network which connects said integrated circuit to a nearest neighbor integrated circuit by performing a logical exclusive OR operation on the allocated binary digits assigned to such integrated circuit and the binary digits assigned to the nearest neighbor integrated circuit.

21. The method of claim 18 wherein the step of identifying nearest neighbor integrated circuits comprises the steps of:
converting the digits allocated to an integrated circuit for one of m dimensions from a Gray code value to a binary equivalent value,
adding to or subtracting from said binary equivalent value a binary value of one to produce a binary resultant value, and
converting the binary resultant value to its Gray code equivalent.

22. Apparatus for simulating an interconnection network of m dimensions in an array of nodes in a binary cube interconnection network of n dimensions where m is less than n comprising:
means for assigning to each node a unique binary number of at least n digits wherein each of n digits specifies the node's position in one dimension of the network of n dimensions,
means for allocating to each of at least two of m dimensions certain of the digits in the binary number assigned to the node according to a rule which is applied to each binary number in like fashion, and
means for identifying for each node that node's nearest neighbor in a dimension in the network of m dimension as those nodes at which the allocated digits of the binary numbers assigned to said nodes immediately precede and immediately succeed the allocated digits assigned to that node when the allocated digits are regarded as Gray code values.

23. The apparatus of claim 22 further comprising means for identifying at each node a dimension of the interconnection network which connects said node to a nearest neighbor node by performing a logical exclusive OR operation on the allocated binary digits assigned to such node and the allocated binary digits assigned to the nearest neighbor node.

24. The apparatus of claim 22 further comprising means for communicating with a nearest neighbor node in the simulated network of m dimensions.

25. The apparatus of claim 22 wherein m is 2.

26. The apparatus of claim 22 wherein the nodes are integrated circuits.

27. In a parallel processor comprising an array of integrated circuits, each containing at least one processor, and means for interconnecting said integrated circuits in an n-dimensional binary cube network where n is greater than two, apparatus for simulating a two-dimensional interconnection network that extends across said integrated circuits comprising:
means for assigning to each integrated circuit a unique binary number of at least n digits wherein each of n digits specifies the integrated circuit's position in one dimension of the network of n dimensions;

means for allocating to each of two dimensions in the two-dimensional network certain of the digits in the binary number assigned to the integrated circuit according to a rule which is applied to each binary number in like fashion, and means for identifying for each integrated circuit that integrated circuit's nearest neighbors in each of the two dimensions of said two-dimensional network as those integrated circuits at which the allocated digits of the binary numbers assigned to said integrated circuits immediately precede and immediately succeed the allocated digits assigned to that integrated circuit when the allocated digits are regarded as Gray code values.

28. The apparatus of claim 27 wherein there are a plurality of processors at each integrated circuit, said apparatus further comprising a permuting device at each integrated circuit for permuting output signals from the processors of such integrated circuit so as to establish for each processor nearest neighbors in each of the two dimensions of the two dimensional network.

29. The apparatus of claim 27 wherein there are a plurality of processors and memory storage locations at each integrated circuit, said apparatus further comprising a permuting means at each integrated circuit, said permuting means having a plurality of inputs and an equal number of outputs and an array of exchangers interposed between said processors and said memory storage locations, each exchanger having first and second inputs, first and second outputs, and means for selectively connecting either said first input to said first output and said second input to said second output or said first input to said second output and said second input to said first output, sufficient exchangers being used so that an input to the permuting means can be connected to any one of the outputs from the permuting means.

30. The method of claim 8 wherein the permuting device comprises a plurality of inputs, an equal number of outputs and an array of exchangers, each exchanger having first and second inputs, first and second outputs, and means for selectively connecting either said first input to said first output and said second input to said second output or said first input to said second output and said second input to said first output, sufficient exchangers being used so that an input to the permuting device can be connected to any one of the outputs from the permuting device.

31. A method of simulating an interconnection network between an array of n processors comprising computer performed steps of:

providing a memory having n storage locations to which data may be written and from which data may be read, interposing between said array of n processors and said memory having n storage location a permuting device having n inputs, n outputs, and n switchable paths for interconnecting said inputs and outputs in at least two interconnection patterns, each of the n processors being connected to one of the n storage locations via one of the n inputs and one of the n outputs of the permuting device, whereby the n processors are connected to different storage locations in accordance with the interconnection patters of the n switchable paths, and providing data from a first processor to a second processor via said permuting device and said memory by storing data from said first processor at a storage location from which said data is read by said second processor.

32. The method of claim 31 wherein data transits the permuting device once in being provided from the first processor to the second processor.

33. The method of claim 31 wherein the permuting device comprises a plurality of inputs, an equal number of outputs and an array of exchangers, each exchanger having first and second inputs, first and second outputs, and means for selectively connecting either said first input to said first output and said second input to said second output or said first input to said second output and said second input to said first output, sufficient exchangers being used so that an input to the permuting device can be connected to any one of the outputs from the permuting device.

34. A method of simulating a two-dimensional interconnection network in an array of nodes that are interconnected in an n dimensional network, each node having a position in the network that is specified by a number having n digits wherein each digit of said number specifies the position of the node in one dimension of the network, said method comprising computer performed steps of:

for each node, identifying that node's nearest neighbors in a first dimension in the two-dimensional interconnection network as those two nodes for which a first ordered subset of the digits of the numbers that specify the position of said two nodes in the n dimensional network immediately precede and immediately succeed a first ordered subset of the digits that specify the position of that node in the n dimensional network when the first ordered subsets of digits are regarded as Gray code values and are chosen according to a rule that is applied to each number in like fashion, and for each node, identifying that node's nearest neighbors in a second dimension in the two-dimensional interconnection network as those two nodes for which a second ordered subset of the digits of the numbers that specify the position of said two nodes in the n dimensional network immediately precede and immediately succeed a second ordered subset of the digits that specify the position of that node in the n dimensional network when the second ordered subsets of digits are regarded as Gray code values, and are made up of the digits of the numbers that are not in the first ordered subsets, and are chosen according to a rule that is applied to each number in like fashion.

35. The method of claim 34 wherein the n dimensional network is a binary cube and the number that specifies the position of a node in the n dimensional network is a binary number.

36. The method of claim 34 wherein a plurality of processors are located at each node.

37. The method of claim 34 further comprising the step of establishing communication between a node and one of its nearest neighbor nodes in said first or second dimensions.

38. The method of claim 34 wherein the step of identifying that node's nearest neighbor in the first or second dimension is performed in parallel across the nodes of the n dimensional network.

39. A method of simulating an interconnection network of m dimensions in an array of nodes that are interconnected in an n dimensional network where m is more than one and less than n, each node having a position in the dimensional network that is specified by a number having n digits wherein each digit specifies the position of the node in one dimension of the network, said method comprising computer performed steps of:

for each node, identifying that node's nearest neighbors in a first dimension in the interconnection network of m dimensions as that node for which a first ordered subset of the digits of the numbers that specify the position of said node in the n dimensional network immediately precede and immediately succeed a first ordered subset of the digits that specify the position of that node in the n dimensional network when the first ordered subsets of digits are regarded as Gray code values and the digits of the subset are chosen according to a rule that is applied to each number in like fashion, for each node, identifying one of that node's nearest neighbors in a second dimension in the interconnection network of m dimensions as that node for which a second ordered subset of the digits of the numbers that specify the position of said node in the n dimensional network immediately precede or immediately succeed a second ordered subset of the digits that specify the position of that node in the n dimensional network when the second ordered subsets of digits are regarded as Gray code values, and are made up of the digits of the numbers that are not in the first ordered subsets, and the digits of the subset are chosen according to a rule that is applied to each number in like fashion, and for each node, establishing communication between that node and at least one of its nearest neighbor nodes in each dimension.

40. The method of claim 39 wherein the n dimensional network is a binary cube and the number that specifies the position of a node in the n dimensional network is a binary number.

41. The method of claim 39 wherein a plurality of processors are located at each node.

42. The method of claim 39 wherein the step of identifying that node's nearest neighbor in the first or second dimension is performed in parallel across the nodes of the n dimensional network.

* * * * *